A. C. ZWARICH.
MOTOR.
APPLICATION FILED JAN. 12, 1916.
1,179,599.
Patented Apr. 18, 1916.
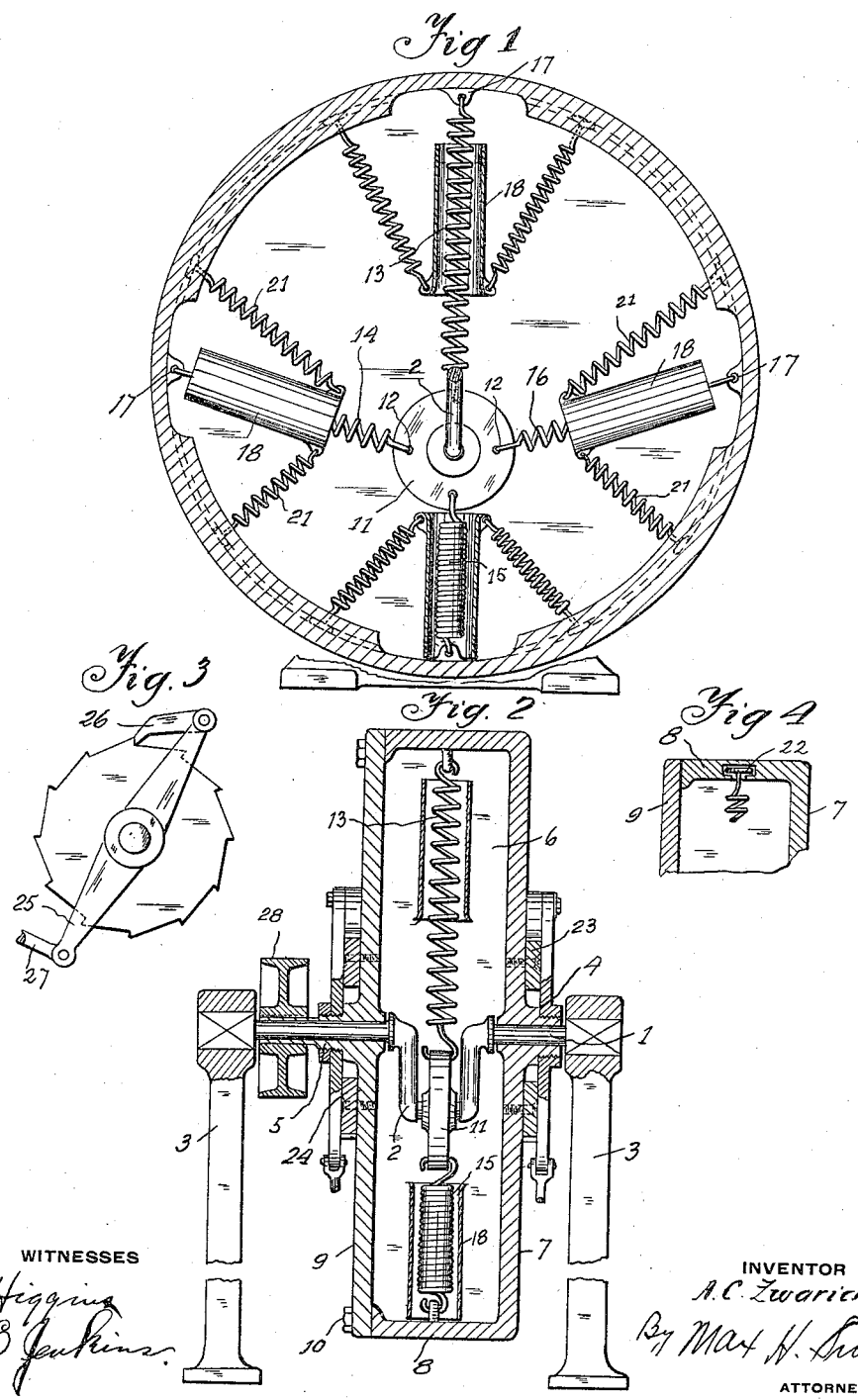
WITNESSES
G. Higgins
B. O. Jenkins
INVENTOR
A. C. Zwarich
By Max H. Srolovitz
ATTORNEYS

UNITED STATES PATENT OFFICE.

ANDREW C. ZWARICH, OF HOMESTEAD, PENNSYLVANIA.

MOTOR.

1,179,599.  Specification of Letters Patent.  Patented Apr. 18, 1916.

Application filed January 12, 1916. Serial No. 71,602.

*To all whom it may concern:*

Be it known that I, ANDREW C. ZWARICH, a subject of the Czar of Russia, residing at Homestead, in the county of Allegheny and State of Pennsylvania, have invented certain new and useful Improvements in Motors, of which the following is a specification.

This invention relates to motors for driving machines or for other purposes wherein it is found applicable and has for its object to provide a device of such type, with means in a manner as hereinafter set forth for changing an intermittent rotary motion into a continuous one.

Further objects of the invention are to provide a motor which is simple in its construction and arrangement, strong, durable, efficient in its use, readily set up and comparatively inexpensive to manufacture.

With the foregoing and other objects in view the invention consists of the novel construction, combination and arrangement of parts as hereinafter more specifically described and illustrated in the accompanying drawing, wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1 is a vertical sectional view of a motor in accordance with this invention. Fig. 2 is a vertical sectional view to that shown in Fig. 1. Fig. 3 is a detail illustrating the driving element. Fig. 4 is a sectional detail.

Referring to the drawings in detail 1 denotes a stationary shaft, provided with a crank 2 intermediate its ends. The shaft 1 is mounted in a pair of uprights 3. Rotatably mounted on the shaft 1, between the uprights 3, is a pair of lateral shafts 4, 5, which form a part of a rotor 6. The shafts 4, 5, are hollow and extending therethrough is the shaft 1. The crank 2 of said shaft 1 is positioned within the rotor 6, and the latter is formed of two sections. One of the sections of the rotor consists of a plate 7 having formed integral with the inner face thereof an annular member 8 which forms the rim of the rotor. The other section consists of a plate 9 which is detachably connected with the annular member 8 by securing devices 10. The rotor 6 revolves upon the stationary shaft 1.

Mounted upon the crank 2 and eccentrically disposed with respect to the rotor 6 is a disk 11 having the inner ends 12 of a series of shifting elements 13, 14, 15 and 16 loosely connected therewith. The outer ends of the shifting elements 13, 14, 15 and 16 are anchored as at 17 in the inner face of the annular member 8. The outer ends of the shifting elements are arranged equi-distant with respect to each other and each of said shifting elements consists of a contractible and expansible coiled-spring.

Loosely mounted upon each of the shifting elements is the sleeve 18 which is employed to reduce the bending of the shifting element to a minimum when the latter is expanded and each of said sleeves has connected therewith at its inner end, a pair of oppositely extending inclined coiled-springs 21. The outer ends of the springs 21, are slidably mounted as at 22, in the inner face of the annular member 8, by such an arrangement the ends can shift so as to prevent the expanding of the springs 21.

Fixed to one side of the rotor is a ratchet wheel 23 and to the other side is a ratchet wheel 24, the latter being in reverse position with respect to the wheel 23. Associating with the ratchet wheels 23, 24, are actuating members each consisting of a lever 25 and a pivoted pawl 26. The lever 25 is connected with an operating device 27. Each ratchet wheel and its actuating member is termed a driving element and each is adapted to intermittently rotate the rotor. One driving element shifts the rotor in one direction and the other in the opposite direction.

The shaft 5 is provided with a pulley or gear 28 whereby the rotor can be coupled with the machine or other device and operate the same.

The shifting elements 13, 14, 15 and 16 are employed to set up a continuous rotatory motion for the intermittent drive, that is to say when the rotor is intermittently operated by a driving element the shifting elements successively expand and contract and during the contracting movement thereof cause the rotor to revolve and this movement is had in view of the fact that the disk 10 is eccentrically disposed with respect to the rotor and that the inner ends of the shifting members are off center. When the shifting element 15 assumes the position illustrated in Fig. 1 it has completely contracted and as the rotor revolves it will gradually expand until it assumes the extended position as illustrated in connection with the element 18, Fig. 1. On further movement of the rotor the shifting member will contract and assist in revolving the rotor and by such an arrangement the intermittent impulse given to the rotor by the driving element will be changed by the action of the shifting element into a continuous motion.

What I claim is:—

1. A motor comprising a crank shaft, a disk carried by the crank of said shaft, a rotor revolving upon said shaft and having said crank arranged therein, means for intermittently rotating said rotor, and a series of expansible and contractible pulling members arranged within said rotor and having their inner ends connected with said disk at equi-distant points and their outer ends connected to the inner face of the rim of the rotor at equi-distant points and providing means for changing the intermittent drive of the rotor into a continuous one.

2. A motor comprising a crank shaft, a disk carried by the crank of said shaft, a rotor revolving upon said shaft and having said crank arranged therein, means for intermittently rotating said rotor, and a series of expansible and contractible pulling members arranged within said rotor and having their inner ends connected with said disk at equi-distant points and their outer ends connected to the inner face of the rim of the rotor at equi-distant points and providing means for changing the intermittent drive of the rotor into a continuous one, sleeves loosely mounted upon said pulling members and springs having their inner ends connected to the inner ends of said sleeves and their outer ends slidably mounted in the rim of the rotor.

3. A motor comprising a crank shaft, a disk carried by the crank of said shaft, a rotor revolving upon said shaft and having said crank arranged therein, means whereby the rotor can be intermittently rotated in either direction, and a series of expansible and contractible pulling members arranged within said rotor and having their inner ends connected with said disk at equi-distant points and their outer ends connected to the inner face of the rim of the rotor at equi-distant points and providing means for changing the intermittent drive of the rotor into a continuous one.

4. A motor comprising a crank shaft, a disk carried by the crank of said shaft, a rotor revolving upon said shaft and having said crank arranged therein, means whereby the rotor can be intermittently rotated in either direction, and a series of expansible and contractible pulling members arranged within said rotor and having their inner ends connected with said disk at equi-distant points and their outer ends connected to the inner face of the rim of the rotor at equi-distant points and providing means for changing the intermittent drive of the rotor into a continuous one, sleeves loosely mounted upon said pulling members and springs having their inner ends connected to the inner ends of said sleeves and their outer ends slidably mounted in the rim of the rotor.

In testimony whereof I affix my signature in the presence of a witness.

ANDREW C. ZWARICH.

Witness:
LUELLA H. SIMON.

Copies of this patent may be obtained for five cents each, by addressing the "Commissioner of Patents, Washington, D. C."